United States Patent [19]

Nakayama et al.

[11] 4,327,820
[45] May 4, 1982

[54] DISC BRAKE AND METHOD OF MANUFACTURING THE SAME

[75] Inventors: Haruhiko Nakayama; Kiyoshi Uchida; Masahiko Sugiyama; Hiromu Konishi, all of Toyota, Japan

[73] Assignees: Toyota Jidosha Kogyo Kabushiki Kaisha; Ishizuka Glass Co., Ltd., both of Aichi, Japan

[21] Appl. No.: 117,783

[22] Filed: Feb. 1, 1980

[30] Foreign Application Priority Data

Dec. 6, 1979 [JP] Japan .................. 54-158511

[51] Int. Cl.$^3$ ............................................ F16D 65/02
[52] U.S. Cl. ...................................... 188/370; 92/248
[58] Field of Search ............... 92/248; 106/39.6, 39.7; 188/72.1, 72.4, 370

[56] References Cited

U.S. PATENT DOCUMENTS 3,489,577 1/1970 Tashiro et al.
3,497,038 2/1970 Schrader et al. .................. 188/370
3,540,895 11/1970 Scheidler et al. .................. 106/39.6
4,170,926 10/1979 Emmett ............................ 92/248 X
4,194,917 3/1980 Sakemi et al. .................. 106/39.6 X

FOREIGN PATENT DOCUMENTS 45-4871 1/1970 Japan.

*Primary Examiner*—Duane A. Reger
*Attorney, Agent, or Firm*—Oblon, Fisher, Spivak, McClelland & Maier

[57] ABSTRACT

A disc brake having a pair of pistons composed of a Devitroceramics having a heat conductivity of about $1 \times 10^{-3}$ cal/cm.sec.°C. to about $4 \times 10^{-2}$ cal/cm.sec.°C., a bend strength of about 5 kg/mm$^2$ to about 55 kg/mm$^2$, a Vickers' hardness of about 400, and a density of smaller than about 4.0 g/cm$^3$. A method of manufacturing the disc brake comprises incorporating into the disc brake a pair of pistons which are prepared by mixing the component materials of the Devitroceramics, melting them to a homogeneous molten state, molding the molten materials into a piston-shaped article, annealing the article for crystallization and heating the article.

7 Claims, 2 Drawing Figures

DISC BRAKE AND METHOD OF MANUFACTURING THE SAME

BACKGROUND OF THE INVENTION

A disc brake is a device which operates to slow down or stop the movement of a vehicle by pressing the friction pads which are actuated by a hydraulic piston onto the side surfaces of a steel disc which rotates concomitantly with a wheel.

Pistons of a conventional disc brake have been made of a steel which has a high heat conductivity. Accordingly, when a vehicle is frequently being stopped or slowed down, the heat produced by frictional contacts between the friction pads and the steel disc is transmitted from the friction pads to a brake fluid via the steel piston to raise the temperature of the brake fluid. The high temperatures of the brake fluid may become a cause for a vapor lock which will give rise to undesirable conditions.

When the brakes are applied, high pressures are also exerted onto the pistons of a disc brake. If there were flaws or rusts in or on the sliding surfaces of the pistons, they may cause the brake fluid to leak. In order to prevent the development of flaws and rust, pistons equipped on conventional disc brakes have been coated with a hard chromium plating. The plating is expensive and disadvantageous in raising the manufacturing cost of a vehicle.

SUMMARY OF THE INVENTION

Accordingly, it is the object of the present invention to provide a disc brake having the pistons made of material which can prevent or diminish the occurence of a vapor lock phenomenon of the brake fluid and which is unlikely to wear in long service.

It is another object of the present invention to provide a disc brake having the pistons which are made of a Devitroceramics which has a low heat conductivity, excellent resistance to corrosion, and light weight, and which may be available with a reasonably low cost.

It is a further object of the present invention to provide a method of manufacturing the disc brake having the construction as will be described hereinabove.

DETAILED DESCRIPTION OF THE INVENTION

Figure 1:
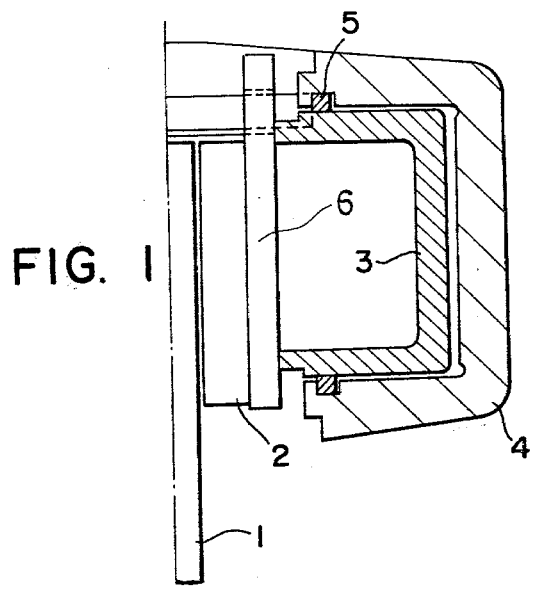
FIG. 1 is a sectional view illustrating the construction of main portion of a disc brake according to the present invention.

The disc brake in accordance with the present invention is provided with the pistons which are composed of a Devitroceramics having a bending strength of about 5 kg/mm$^2$ to 55 kg/mm$^2$, a heat conductivity of about $1 \times 10^{-3}$ cal/cm.sec.°C. to about $4 \times 10^{-2}$ cal/cm.sec.°C., a Vickers' hardness of greater than about 400, and a density of smaller than about 4.0 g/cm$^3$.

More specifically, the bending strength of the Devitroceramics to be used for the present invention is preferably about 10 kg/mm$^2$ to about 55 kg/mm$^2$ and more preferably about 15 kg/mm$^2$ to 55 kg/mm$^2$ and a heat conductivity thereof is preferably about $1 \times 10^{-3}$ cal/cm.sec.°C. to about $1 \times 10^{-2}$ cal/cm.sec.°C. and more preferably about $1 \times 10^{-3}$ cal/cm.sec.°C. to about $9 \times 10^{-3}$ cal/cm.sec.°C. The Vickers' hardness of the Devitroceramics to be used may preferably be up to about 1,000, and the density thereof may preferably range from about 2.4 to 2.8 g/cm$^3$. Furthermore, the Devitroceramics to be used for the present invention is desirable to have a thermal expansion coefficient of up to about $150 \times 10^{-7}$ and preferably below about $50 \times 10^{-7}$. Such lower thermal expansion coefficient is preferred because thermal shocks may be caused when the pistons are wet or submerged in pools, thereby resulting into the destruction or cracking of the pistons in an engine.

It is necessary in the present invention to employ the Devitroceramics having a heat conductivity specified within the above range in order particularly to prevent the occurrence of a vapor lock in the brake fluid. It is also necessary that the Devitroceramics have a bending strength specified within the said range in order to provide the pistons of a disc brake with reliability and safety upon the repetitive application of the brakes and in long service.

Further, the use of the Devitroceramics with a Vickers' hardness specified within the above range is desired to prevent the piston body from being flawn and therefore to exclude a cause for the leakage of a brake fluid. It is furthermore desired to employ the Devitroceramics with a density specified within the above range; this is necessary to maintain the light weight of a vehicle body and the durability of disc brakes.

The Devitroceramics to be used in the present invention includes any glass-ceramics which may be formed using P$_2$O$_5$, As$_2$O$_3$, TiO$_2$, ZrO$_2$, CaF$_2$ or the like as crystal nuclei or which may be formed without the use of any crystal nuclei. Those containing SiO$_2$ or Al$_2$O$_3$ as a major component are preferred. However, the Devitroceramics which may be used for the purposes of the present invention is not limited to those described hereinabove, but it may be employed as long as it has the physical and chemical properties satisfying the above requirements. The Devitroceramics to be used for the present invention may be prepared by varying the compositions of glasses, thermal conditions, the kinds of crystal nuclei or the like to provide desired physical and thermal characteristics. Tables 1 to 5 illustrate representative compositions of the Devitroceramics which satisfy the requirements within the ranges specified hereinabove.

TABLE 1

Devitroceramics using P$_2$O$_5$ and As$_2$O$_3$ as crystal nuclei

| | Composition | | | | | | | Properties | |
|---|---|---|---|---|---|---|---|---|---|
| No. | SiO$_2$ | Al$_2$O$_3$ | Li$_2$O | K$_2$O | Na$_2$O | P$_2$O$_5$ | As$_2$O$_3$ | Coefficient of thermal expansion ($\times 10^{-7}$) | Bending strength (kg/mm$^2$) |
| 1. | 77.5 | 10.0 | 12.5 | — | — | 2.0 | — | 44.3 | 34 |
| 2. | 81.0 | 4.0 | 12.5 | 2.5 | — | 2.0 | — | 110 | 40 |
| 3. | 73.5 | 10.0 | 12.5 | — | 4.0 | 2.0 | — | 88.0 | 25 |

TABLE 1-continued

Devitroceramics using $P_2O_5$ and $As_2O_3$ as crystal nuclei

| No. | \multicolumn{7}{c}{Composition} | Coefficient of thermal expansion ($\times 10^{-7}$) | Bending strength (kg/mm$^2$) |
|---|---|---|---|---|---|---|---|---|---|
| | SiO$_2$ | Al$_2$O$_3$ | Li$_2$O | K$_2$O | Na$_2$O | P$_2$O$_5$ | As$_2$O$_3$ | | |
| 4. | 80.1 | — | 19.9 | 2.0 | — | — | 4.0 | 137 | 32 |
| 5. | 81.0 | 4.0 | 12.5 | 2.5 | — | — | 4.0 | 115 | 35 |
| 6. | 73.5 | 10.0 | 12.5 | 4.0 | — | — | 4.0 | 75 | 17 |

TABLE 2

Devitroceramics using $TiO_2$ as crystal nuclei

| No. | SiO$_2$ | Al$_2$O$_3$ | TiO$_2$ | MgO | CaO | ZnO | BaO | MnO | Coefficient of thermal expansion ($\times 10^{-7}$) | Bending strength (kg/mm$^2$) |
|---|---|---|---|---|---|---|---|---|---|---|
| 1. | 42.8 | 30.2 | 13.0 | 14.0 | — | — | — | — | 16.5 | 17 |
| 2. | 45.2 | 30.5 | 11.5 | 12.5 | — | — | — | — | 14.1 | 27 |
| 3. | 56.0 | 20.0 | 9.0 | 15.0 | — | — | — | — | 56.0 | 22 |
| 4. | 44.5 | 31.1 | 11.1 | 5.3 | 8.0 | — | — | — | — | 8 |
| 5. | 53.4 | 22.2 | 11.1 | — | 13.3 | — | — | — | — | — |
| 6. | 57.8 | 16.0 | 11.1 | — | 15.1 | — | — | — | — | — |
| 7. | 43.5 | 17.4 | 8.7 | 4.3 | — | 26.1 | — | — | 172 | 15 |
| 8. | 43.8 | 17.6 | 12.3 | — | — | — | 26.3 | — | 32.8 | 5.7 |
| 9. | 48.2 | 23.6 | 9.1 | — | — | — | — | 19.1 | 101 | 12 |
| 10. | 40.8 | 22.8 | 9.1 | — | — | — | — | 27.3 | 20.6 | 7.5 |

TABLE 3

Devitroceramics using $ZrO_2$ as crystal nuclei

| No. | SiO$_2$ | Al$_2$O$_3$ | Li$_2$O | MgO | P$_2$O$_5$ | ZrO$_2$ | K$_2$O | PbO | Coefficient of thermal expansion ($\times 10^{-7}$) | Bending strength (kg/mm$^2$) |
|---|---|---|---|---|---|---|---|---|---|---|
| 1. | 53.0 | 4.6 | 10.8 | 10.8 | 13.1 | 7.7 | — | — | 73 | 24 |
| 2. | 56.1 | 4.6 | 10.8 | 9.3 | 11.5 | 7.7 | — | — | — | 19 |
| 3. | 53.0 | 3.0 | 11.7 | 12.0 | 11.9 | 8.4 | — | — | 80 | 24 |
| 4. | 60 | 35 | 5 | — | 3 | 4 | 1 | — | 17.4 | 8.3 |
| 5. | 65 | 30 | 5 | — | 3 | 4 | 1 | 2 | 12.7 | 6.3 |

TABLE 4

Devitroceramics using $CaF_2$ as crystal nuclei

| No. | SiO$_2$ | Al$_2$O$_3$ | CaF | Li$_2$O | PbO | Coefficient of thermal expansion ($\times 10^{-7}$) | Bending strength (kg/mm$^2$) |
|---|---|---|---|---|---|---|---|
| 1. | 69 | 20 | 11 | 5 | 0.2 | 24.6 | 17 |
| 2. | 63 | 20 | 17 | 5 | 0.2 | 38.5 | 22 |
| 3. | 60 | 20 | 20 | 5 | 0.2 | 39.4 | 22 |
| 4. | 57 | 20 | 23 | 5 | 0.2 | 42.1 | 23 |
| 5. | 51 | 20 | 29 | 5 | 0.2 | 45.8 | 21 |

TABLE 5

Devitroceramics using no-crystal nucleus

| No. | SiO$_2$ | Al$_2$O$_3$ | MgO | Li$_2$O | Coefficient of thermal expansion ($\times 10^{-7}$) | Bending Strength (kg/mm$^2$) |
|---|---|---|---|---|---|---|
| 1. | 62 | 23 | 15 | 4 | 39 | 15.5 |

Table 6 shows mechanical and thermal properties of various commercially available Devitroceramics. All the products are construed to be within the scope of the present invention.

TABLE 6

Properties of various Devitroceramics

| Designation | Specific gravity | Vickers' hardness | Bending strength (kg/mm$^2$) | Heat conductivity (cal/cm.sec.°C.) | Coefficient of thermal expansion ($\times 10^{-7}$) |
|---|---|---|---|---|---|
| Devitron® 1-D type | 2.49 | 590 | 33 | $4.7 \times 10^{-3}$ | 10 |
| Devitron® 2-D type | 2.50 | 580 | 25 | $3.2 \times 10^{-3}$ | 40 |
| Devitron® H type | 2.50 | 650 | 25 | — | 41 |
| Devitron® LS type | 2.49 | 670 | 33 | $5 \times 10^{-3}$ | 111 |
| Neoceram® GC-2 | 2.47 | 840 | 10 | — | 0.7 |
| Neoceram® GC-3 | 2.47 | 830 | 13 | $4 \times 10^{-3}$ | 3.4 |
| Neoceram® N-15 | 2.47 | 900 | 18 | — | 15.1 |
| Neoceram® N-11 | 2.47 | 950 | 18 | — | 11–15 |
| Neoceram® N-S | 2.50 | 1100 | 50 | — | 23.3 |
| Miracron® PP-1 | 2.43 | — | 35 | $5 \times 10^{-3}$ | 91 |
| Miracron® PH-1 | 2.53 | — | 15 | — | 11 |
| Miracron® PH-3 | 2.55 | — | 12 | $4 \times 10^{-3}$ | 6 |
| Miracron® PC-1 | 2.40 | — | 52 | — | 68 |

TABLE 6-continued

| | Properties of various Devitroceramics | | | | |
|---|---|---|---|---|---|
| Designation | Specific gravity | Vickers' hardness | Bending strength (kg/mm$^2$) | Heat conductivity (cal/cm.sec. °C.) | Coefficient of thermal expansion ($\times 10^{-7}$) |
| Heatron ® T | 2.55 | 890 | 12 | $3 \times 10^{-3}$ | 6 |
| Heatron ® W | 2.54 | 940 | 15 | — | 11 |
| Pyroceram ® 9606 | 2.60 | 640 | 14 | $8.7 \times 10^{-3}$ | 57 |
| Pyroceram ® 9608 | 2.50 | — | 16 | $4.7 \times 10^{-3}$ | 7–20 |
| Photoceram ® 8603 | 2.45 | — | 9 | — | 104 |

Notes.
Devitrons ®: product of Ishizuka Glass Co., Ltd.
Neocerams ®: product of Narumi Seito Co., Ltd.
Miracrons ®: product of NGK Insulators., Co., Ltd.
Heatrons ®: product of Fuji Photofilm Co., Ltd.
Pyrocerams ®: product of Coning Co., Ltd.
Photoceram ®: product of Coning Co., Ltd.

The Devitroceramics to be used in the present invention may be formed into desired shapes in conventional manner by melting a batch of raw materials to a homogeneously molten fluid, molding the fluid into desired shapes in such a way as in producing ordinary glasswares to form transparent shaped articles and then heating the article gradually, without changing the shapes of the articles, to get final shaped articles in which aggregates of fine crystals, that is, polycrystalline products, are produced. More specifically, the pistons for the disc brakes in accordance with the present invention may be prepared, for example, by mixing silica sand, aluminum oxide, lithium carbonate and zirconium oxide as a crystal nucleus, melting them at 1400° to 1600° C., press molding the resulting homogenously molten materials at about 1,100° C. into desirously shaped articles having the shape of piston, machining the articles after it is gradually cooled, heating them to have the components crystallize, and polishing the sliding surface of the crystallized articles to final products for use as pistons. The shapes of the pistons are not limited to particular ones, but they are desired to be in a U-shape in a cross section and be so designed that the surface area of the piston which is in contact with the friction pads becomes minimized to undergo the influence of the friction heat only to a minimum extent.

Turning now to FIG. 1 for reference to the description on the disc brake in accordance with the present invention as compared with conventional disc brakes, the disc 1 is pressed by the friction pad 2 by means of the compressing force of the piston 3 which is actuated by a hydraulic pressure of a brake liquid (not shown). In FIG. 1, reference numeral 4 denotes a caliper, 5 denotes an oil seal ring, and 6 denotes a support member for securing the friction pad. In accordance with the present invention, the piston 3 is composed of a low heat-conductive Devitroceramics as mentioned hereinabove so that the heat produced by the friction between the contact surface of the friction pad 2 and the disc 1 is transmitted only to a slight extent to the brake liquid in a space defined between the piston 3 and the caliper 4, thereby preventing or diminishing to the minimum extent the occurrence of a vapor lock. The employment of the afore-mentioned Devitroceramics for the pistons of the disc brake in accordance with the present invention can also prevent the piston from producing rusts which may damage the rubber-made oil seal ring and consequently prevent the leakage of the brake liquid.

Conventional disc brakes employ steel pistons so that the oil seal ring provided between the piston and the caliper will be projected out due to expansion of the steel pistons by the heat produced by the friction of the disk with the friction pads and transferred to the pistons. In the case of the disc brake in accordance with the present invention, the pistons of the Devitroceramics which has lower thermal expansion coefficient than iron does not cause the projection of the rubbery oil seal ring. Accordingly, the disc brake according to the present invention does not encounter problems such as damages of the oil seal ring and leakage of the brake liquid.

The disc brake having the pistons made of one kind of the Devitroceramics (heat conductivity of 0.004 cal/cm.sec.°C.) in accordance with the present invention was tested for a vapor lock, as compared with the disc brakes with the pistons composed of a steel (heat conductivity: 0.11 cal/cm.sec.°C.; Japanese Industrial Standard 15) and of a ceramics, silicon nitride (Si$_3$N$_4$) having a heat conductivity of 0.04 cal/cm.sec.°C. Each test was conducted by rotating a wheel under an initial velocity of 50 kilometers per hour and then stopping the rotation of the wheel at a deceleration of 0.5 G in respective manner.

Figure 2:
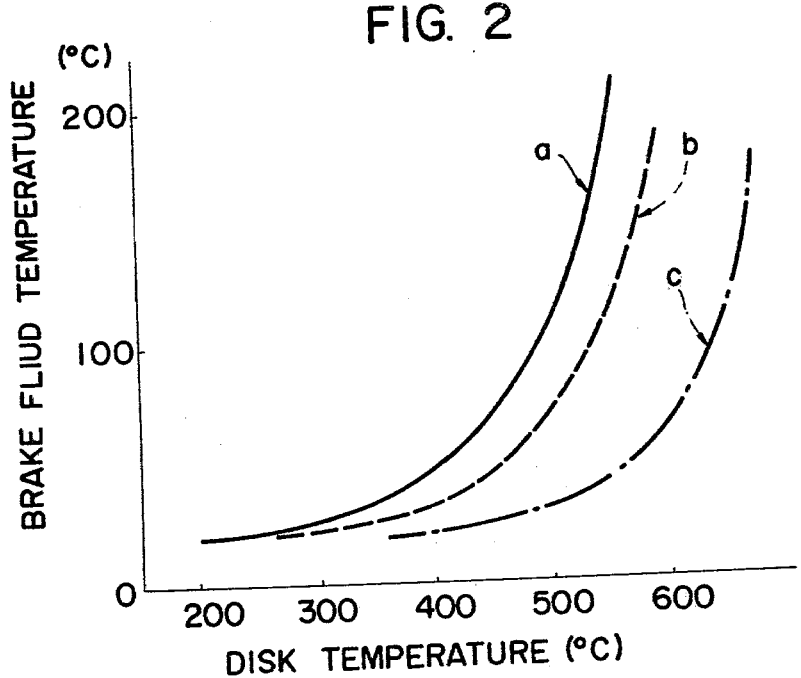
FIG. 2 is a diagram illustrating the relations between the temperature of a disc and the temperature of a brake fluid in a vapor lock test.

A brake fluid generally has a boiling point of about 240° C. and it may decrease to about 140° C. when water is contaminated therein for a long period of service. When the temperature of the brake fluid exceeds about 200° C., there is a possibility that a vapor lock occurs. As may be apparent from FIG. 2, the curve a shows that the temperature of a brake fluid in a disc brake having the conventional steel pistons reached 200° C. at the disc temperature of 550° C. With the silicon nitride pistons, as shown in the curve b, the brake fluid reached 115° C. at the disc temperature of 550° C., whereas the curve c shows that the temperature of the brake fluid, when the Devitroceramics was used for the pistons, went up only to 42° C. at the same disc temperature as above. This clearly indicates that the disc brake in accordance with the present invention has remarkable effects on prevention of a vapor lock in the brake fluid.

The disc brake in accordance with the present invention uses the Devitroceramics having a density of lower than about 4.0 g/cm$^3$, particularly lower than about 2.5 g/cm$^3$ for the pistons thereof so that it may contribute to rendering the weight of a disc brake light, thereby decreasing the weight of a vehicle body and consequently improving the mileage of a vehicle. The conventional steel pistons require expensive chromium plating on the surface thereof to achieve desired degrees of anti-corrosion, anti-wear properties, and hardness, whereas the Devitroceramics pistons in accordance with the present invention may achieve such performances to desired extent without further processings and treatment because of its chemical stability and mechanical strength which is as much as steel treated by hard chromium plating procedures. In particular, the use of the Devitroceramics may do without expensive and laborious treatment of waste waters from chromium plating, and this is also advantageous from the standpoint of anti-pollution. Since the Devitroceramics to be used for the present invention has a compressive strength as much as or greater than that of steel (30-80 kg/mm$^2$), it is also satisfactory in mechanical strength to apply it to pistons for a disc brake and even in processability. Furthermore, the disc brake in accordance with the present invention may be manufactured at the same price as or at a price sufficiently competitive with commercially available conventional ones.

What is claimed is:

1. A disc brake having a friction pad and a pair of pistons composed of a Devitroceramics comprising a heat conductivity of about $1 \times 10^{-3}$ cal/cm.sec.°C. to about $4 \times 10^{-2}$ cal/cm.sec.°C. and bending strength of about 5 kg/mm$^2$ to about 55 kg/mm$^2$, each said piston having a U-shape in cross section, the legs of said U having a reduced thickness at the ends thereof and terminating in a transverse distal surface, wherein each said piston contacts an element which is in contact with said friction pad only at said distal surface.

2. A disc brake according to claim 1, wherein the Devitroceramics comprising a heat conductivity of about $1 \times 10^{-3}$ cal/cm.sec.°C. to about $1 \times 10^{-2}$ cal/cm.sec.°C. and a bending strength of about 10 kg/mm$^2$ to about 55 kg/mm$^2$.

3. A disc brake according to claim 1, wherein the Devitroceramics comprising a heat conductivity of about $1 \times 10^{-3}$ cal/cm.sec.°C. to about $9 \times 10^{-3}$ cal/cm.sec.°C. and a bending strength of about 15 kg/mm$^2$ to about 55 kg/mm$^2$.

4. A disc brake according to claim 1, wherein the Devitroceramics has a Vickers' hardness of greater than about 400 and a density of smaller than about 4.0 g/cm$^3$.

5. A disc brake according to claim 1, wherein the Devitroceramics has a thermal expansion coefficient of smaller than $50 \times 10^{-7}$.

6. A disc brake according to claim 1, wherein the heat conductivity is below about $1 \times 10^{-2}$ cal/cm.sec.°C. and the bending strength is above 10 kg/mm$^2$.

7. A disc brake according to claim 4, wherein the Vickers' hardness is from about 400 to about 1000 and the density is from about 2.4 to about 2.8 g/cm$^3$.

* * * * *